(12) United States Patent
Schlaich (10) Patent No.: US 11,974,677 B2
(45) Date of Patent: May 7, 2024

(54) ELECTROMOTIVE ADJUSTING UNIT FOR ADJUSTING THE INCLINATION OF A SUPPORT PART OF AN ITEM OF SEATING FURNITURE COMPRISING AN ELECTOMOTIVE ADJUSTING UNIT

(71) Applicant: HETTICH FRANKE GMBH & CO. KG, Balingen-Weilstetten (DE)

(72) Inventor: Marcel Schlaich, Geislingen (DE)

(73) Assignee: Hettich Franke GmbH & Co. KG, Balingen-Weilstetten (DE)

( * ) Notice: Subject to any disclaimer, the term of this patent is extended or adjusted under 35 U.S.C. 154(b) by 37 days.

(21) Appl. No.: 17/612,296

(22) PCT Filed: May 7, 2020

(86) PCT No.: PCT/EP2020/062738
§ 371 (c)(1),
(2) Date: Nov. 18, 2021

(87) PCT Pub. No.: WO2020/234001
PCT Pub. Date: Nov. 26, 2020

(65) Prior Publication Data
US 2022/0257020 A1    Aug. 18, 2022

(30) Foreign Application Priority Data

May 20, 2019    (DE) ..................... 10 2019 113 392.0

(51) Int. Cl.
*A47C 7/38*    (2006.01)
*A47C 20/04*    (2006.01)
(Continued)

(52) U.S. Cl.
CPC .............. *A47C 7/38* (2013.01); *A47C 20/041* (2013.01); *A47C 1/036* (2013.01); *A47C 7/54* (2013.01); *B60N 2/829* (2018.02)

(58) Field of Classification Search
CPC ........... B60N 2/829; A47C 7/38; A47C 1/036
See application file for complete search history.

(56) References Cited

U.S. PATENT DOCUMENTS 10,856,665 B2 * 12/2020 Hesse .................... B60N 2/829
2009/0301239 A1   12/2009 Heinrichs
(Continued)

FOREIGN PATENT DOCUMENTS

CN       106347176 A     1/2017
CN       208941407 U     6/2019
(Continued)

OTHER PUBLICATIONS

1 Search Report dated Oct. 20, 2022 in related/corresponding EP Application No. 20 724 818.8.
(Continued)

*Primary Examiner* — Syed A Islam
(74) *Attorney, Agent, or Firm* — PATENT PORTFOLIO BUILDERS PLLC (57) ABSTRACT

An electromotive adjusting device for adjusting the inclination of a protective part of an item of seating furniture includes a one pivot drive for securing to the body element of the item of seating furniture and a rotatable drive element on which a drive bracket can be securely fixed and which supports the protective part.

12 Claims, 11 Drawing Sheets

(51) Int. Cl.
*A47C 1/036* (2006.01)
*A47C 7/54* (2006.01)
*B60N 2/829* (2018.01)

(56) References Cited

U.S. PATENT DOCUMENTS

| | | | |
|---|---|---|---|
| 2010/0242641 A1* | 9/2010 | Mackert | A47C 7/38 74/89 |
| 2011/0025150 A1 | 2/2011 | Heinrichs | |
| 2015/0021969 A1 | 1/2015 | Yin et al. | |
| 2019/0021503 A1 | 1/2019 | Lu | |

FOREIGN PATENT DOCUMENTS

| | | |
|---|---|---|
| DE | 202006004613 U1 | 3/2007 |
| DE | 102011075183 A1 | 3/2012 |
| DE | 102012101846 A1 | 9/2013 |
| DE | 102013200328 A1 | 7/2014 |
| DE | 102015106939 A1 | 11/2016 |
| DE | 202016107045 U1 | 1/2017 |
| JP | H02100532 U | 8/1990 |
| JP | H0546345 U | 6/1993 |
| JP | H0719305 Y2 | 5/1995 |
| JP | 2000166694 A | 6/2000 |
| JP | 2001239862 A | 9/2001 |
| RU | 2678761 C2 | 1/2019 |
| WO | 2013128056 A1 | 9/2013 |

OTHER PUBLICATIONS

International Search Report dated Jun. 15, 2020 in related/corresponding International Application No. PCT/EP2020/062738.
Search Report created Jan. 13, 2020 in related/corresponding DE Application No. 10 2019 113 392.0.
Written Opinion dated Jun. 15, 2020 in related/corresponding International Application No. PCT/EP2020/062738.
Office Action dated Dec. 9, 2023 in related/corresponding CN Application No. 202080037296.8.
Search Report dated Aug. 18, 2023 in related/corresponding RU Application No. 2021134096/03.

* cited by examiner

ELECTROMOTIVE ADJUSTING UNIT FOR ADJUSTING THE INCLINATION OF A SUPPORT PART OF AN ITEM OF SEATING FURNITURE COMPRISING AN ELECTOMOTIVE ADJUSTING UNIT

BACKGROUND AND SUMMARY OF THE INVENTION

Exemplary embodiments of the invention relate to an electromotive adjusting unit for adjusting the inclination of a support part of an item of seating furniture, as well as to a seating furniture having an electromotive adjusting unit.

Seating furniture, in particular upholstered armchairs or parts of an upholstered sofa, can have support parts that are adjustable in inclination. Headrests or armrests, for example, are used as support parts which, due to their inclination adjustability, enable ergonomic adjustability of the furniture on the one hand and changeability of the design on the other hand. A comfortable adjustment can be achieved by means of an electromotive adjusting unit. Such electromotive adjusting units comprise at least one drive unit, which is usually in the form of a linear drive and which acts via push rods and/or levers on the support part, which is pivotably connected to a body element, for example a back part, via a pivot fitting. For example, the publication DE 10 2013 200328 A1 shows such an adjusting unit in which a headrest is pivoted by a push drive via a link lever chain.

In these arrangements known from the prior art, there must be sufficient space in the back part to be able to arrange the linear drive in the back part and to be able to guide the required arrangement of push rods and/or levers to the support part. The push rods or levers must also be guided through the transition area between the body element and the support part, which can lead to an increased risk of jamming and is also disadvantageous from a visual point of view.

Exemplary embodiments of the present invention are directed to an electromotive adjusting unit for adjusting the inclination of a support part of an item of seating furniture, which is as simple as possible in construction and wherein a transmission of movement to the support part is as unproblematic as possible.

An electromotive adjusting unit of the type mentioned at the beginning has a pivot drive for attachment to a body element of the seating furniture having a rotatable output element, on which an output plate can be mounted in a rotationally fixed manner, which supports the support part.

In the electromotive adjusting unit according to the invention, instead of a linear drive, there is thus a pivot drive, on the output element of which the support part is mounted via an output plate. The pivot drive is thus both an adjusting drive and a pivot bearing for the support part, which results in a compact structure. In addition, no additional levers or the like are required to transmit the movement of the drive.

The output plate may have the shape and size of common mounting brackets of (passive) pivot fittings, so that support parts designed for attachment to known pivot fittings can be used with the electromotive adjusting unit according to the application without modification.

The body element may be a fixed element of the seating furniture, for example a seat frame, or it may be a movable element, such as a back part, with respect to which the support part is adjusted in inclination according to the invention.

In an advantageous design of the electromotive adjusting unit, the output element engages positively in a corresponding receptacle of the output plate. The required torques can be transmitted well and reliably between the output element and the output plate due to the positive locking, for example achieved by means of toothing. The output element can, for example, be provided with an external multi-tooth, which is inserted into an opening with an internal multi-tooth, which is formed on the output plate.

In a further advantageous design of the electromotive adjusting unit, the pivot drive comprises a carrier plate by means of which it can be fastened to the body element and on which at least two intermeshing gearwheels are mounted which form a reduction gear. The high torques on the output element required for pivoting the support part can be achieved by means of the reduction gear. By using the carrier plate, which simultaneously supports the gearwheels of the reduction gear and serves to fasten it to the body element, a simple and material- and cost-saving structure is achieved. The fastening to the body element can again be carried out in the same way as with the known (passive) pivot fittings, so that the furniture body does not have to be modified or only insignificantly modified for the use of the electromotive adjusting unit.

Preferably, a bearing plate is arranged parallel to the carrier plate in which the gears are also mounted. The output element is further preferably arranged or formed on one of the gearwheels of the pivot drive. The bearing of this (output) gearwheel then advantageously also represents a pivot bearing of the support part.

In the context of the application, a gearwheel is also to be understood as a gearwheel segment that does not have a full set of teeth, but only over a certain angular range. In particular, the gearwheel on which the output element is arranged or formed may be designed as a gearwheel segment, since the pivoting angle of the output element is usually less than 180° or often even less than 90°.

In a further advantageous design of the electromotive adjusting unit, a further pivot drive is provided which is coupled to the pivot drive via a synchronous shaft and which likewise has a rotatable output element on which an output plate can likewise be mounted in a rotationally fixed manner, which output plate also carries the support part. Preferably, the further pivot drive also has a carrier plate on which at least two intermeshing gearwheels are mounted, which form a reduction gear, wherein the output element is arranged or formed on one of the gearwheels of the further pivot drive. Thus, via the further pivot drive, on the one hand a pivot bearing of the support part on a second side and, on the other hand, a synchronous drive of this second side are produced. This design is thus particularly suitable for wider support parts. In the case of narrower support parts, on the other hand, a one-sided drive is also possible only by means of the first-mentioned pivot drive alone.

Preferably, in the case of a two-sided drive, the reduction gear of the pivot drive and the reduction gear of the further pivot drive have the same reduction ratio, wherein drive shafts of the two reduction gears are coupled to one and the same motor unit. An identical transmission ratio can be achieved in particular by substantially identical construction of both gears, so that advantageously as many identical components as possible (gearwheels, output element, bearing plate, etc.) can be used for the pivot drive and the further pivot drive, thereby reducing manufacturing and storage costs.

In a further advantageous design of the electromotive adjusting unit, the motor unit comprises an electric motor and a downstream gear. The gear of the motor unit may be, for example, a worm gear. In this case, a self-locking mechanism may be provided that holds the support part in its position at least in the case of forces acting properly from outside, even if the motor unit is not supplied with current.

An item of seating furniture according to the invention has such an electromotive adjusting unit, via which a support part is pivotably mounted. The advantages described in connection with the adjusting unit are obtained. In an advantageous design, the support part is a head part, also called headrest, of the seating furniture. This can then be pivoted relative to a back part as a body element. Alternatively, the support part can also be an armrest, also called an elbow rest, which can then be pivoted relative to a side part as a body element. It will be understood that the body element itself may additionally be movable relative to other parts of the seating furniture. For example, a back part can have an inclination adjustment facility and in turn support a pivotable head part via the electromotive adjusting unit.

BRIEF DESCRIPTION OF THE DRAWING FIGURES

The invention is explained in more detail below with reference to exemplary embodiments with the aid of figures, wherein.

In all figures, identical reference signs indicate identical or similarly acting elements. For reasons of clarity, not every element in all figures is provided with a reference sign.

DETAILED DESCRIPTION

In the description, terms such as top, bottom, left, right refer exclusively to the exemplary representation selected in the respective figures. Only the terms front and rear refer to an orientation of the seating furniture, wherein the front side of the seating furniture is the side facing the user, on which there is also a seating surface for the user.

Figure 1A:
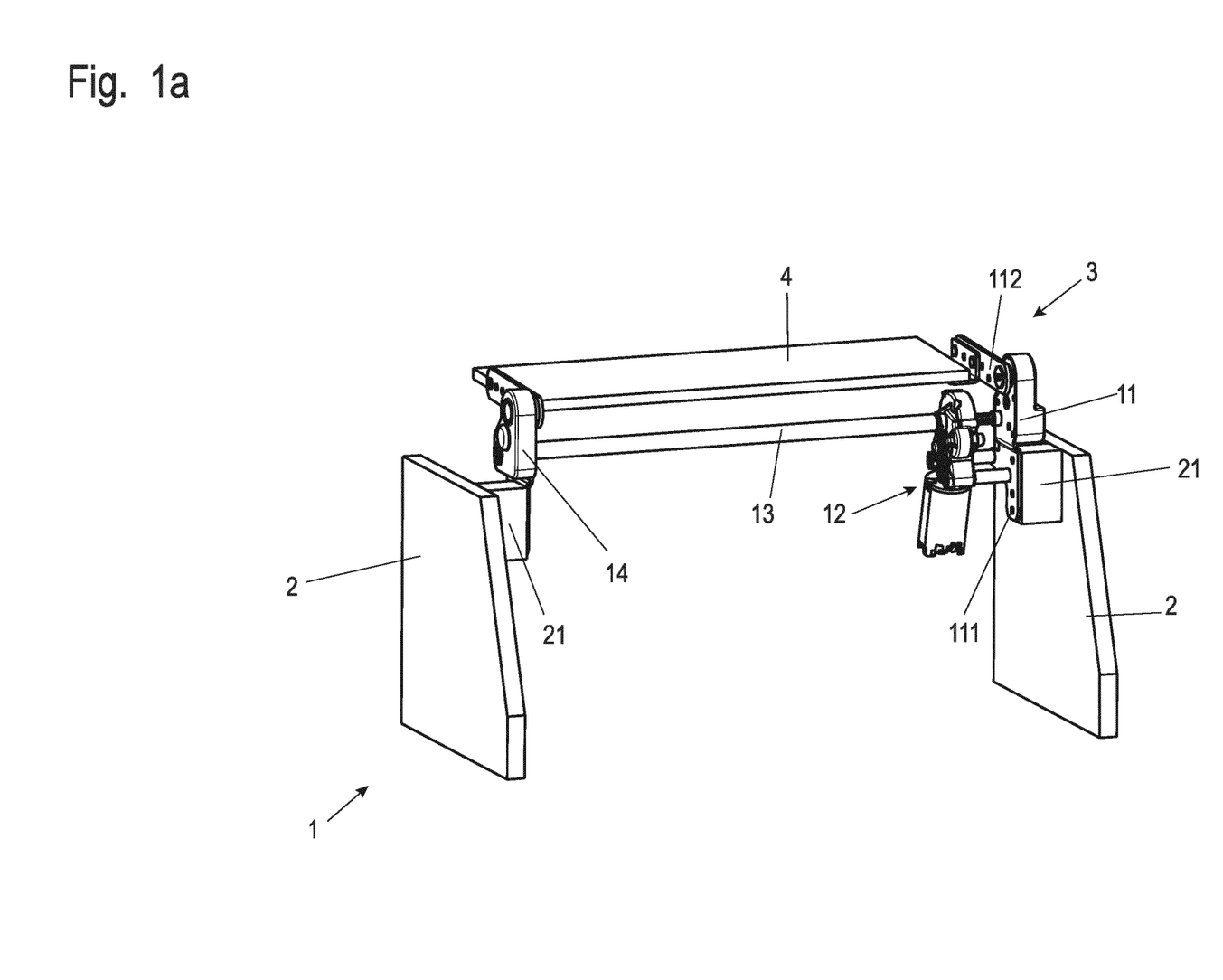
FIGS. 1a-c show a section of seating furniture having an adjusting unit in a first adjustment position in different views.
Figure 1B:
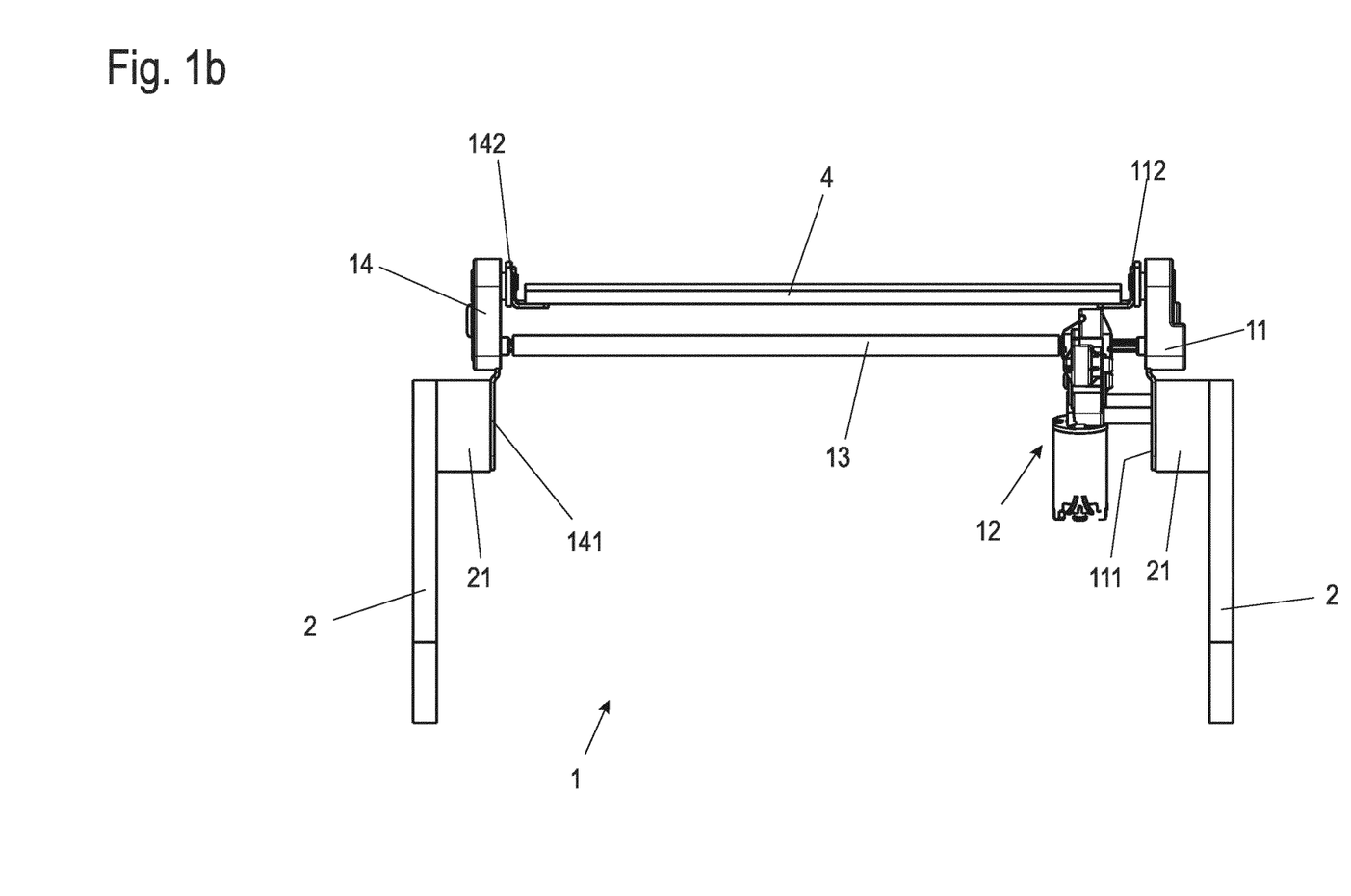
Figure 1C:
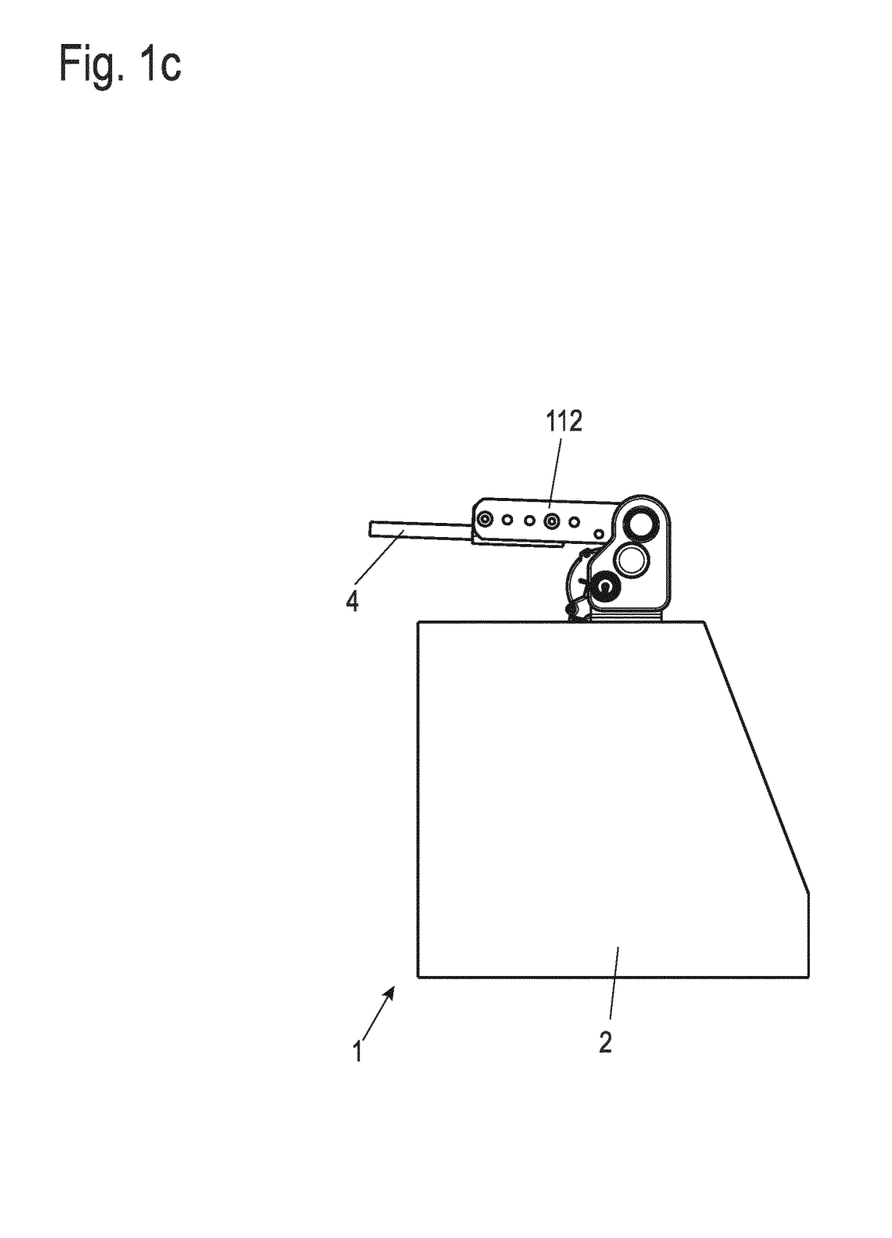

In FIGS. 1a-c, a section of an item of seating furniture 1 having a back part 2 and a head part 3, also referred to as a head rest, which can be pivoted relative to this back part 2, is reproduced in various views. The head part 3 thus represents a pivotable support element of the seating furniture 1, which is mounted on the back part 2 as a body element. FIG. 1a shows the section of the seating furniture 1 in an isometric view from diagonally in front, FIG. 1b shows a front view and FIG. 1c a side view.

In FIGS. 1a-c, the seating furniture 1 is reproduced with a head part that is tapered to the maximum extent towards the rear, i.e., away from the user.

Figure 2A:
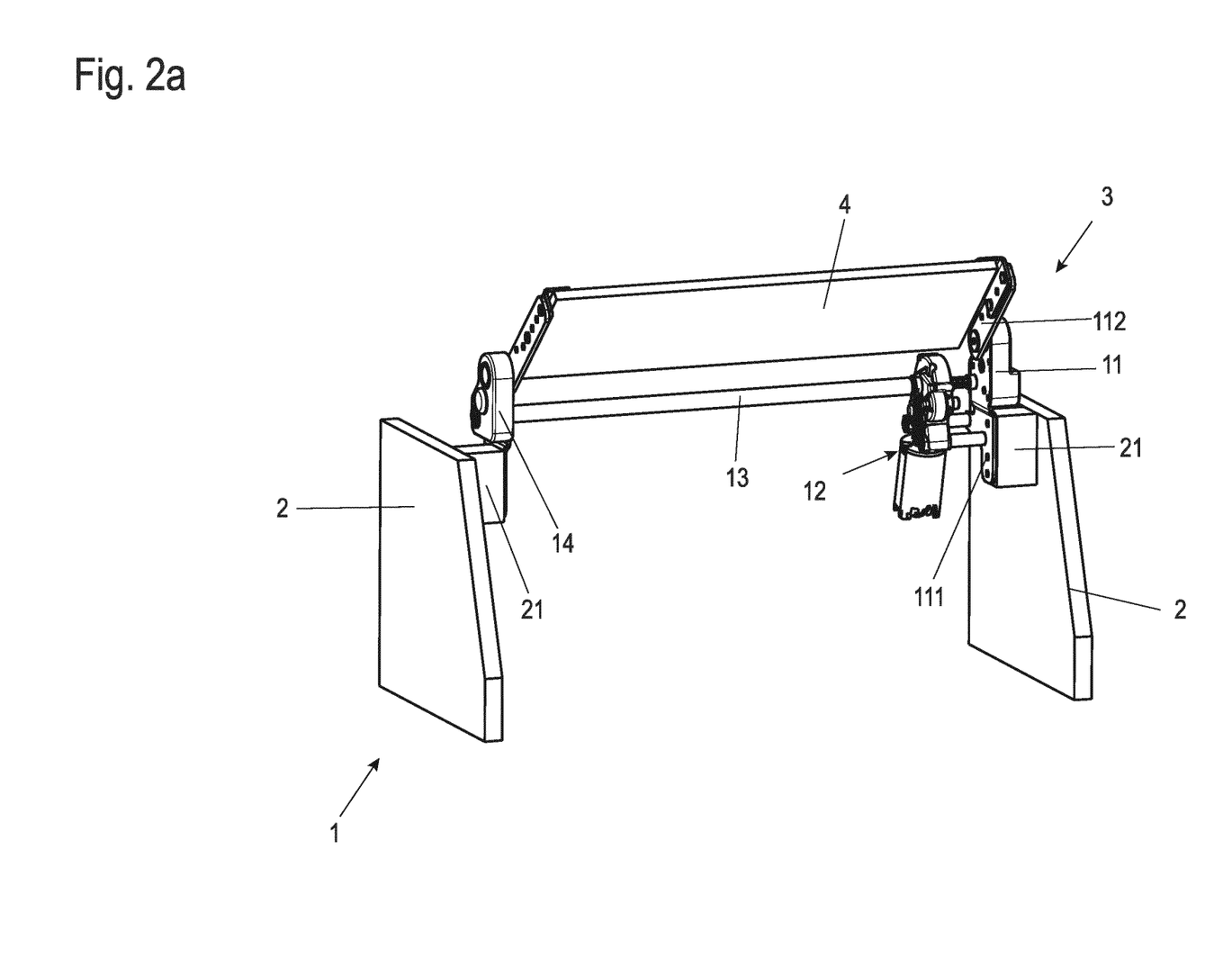
FIGS. 2a-c show the seating furniture according to FIGS. 1a-1c in a second adjustment position in different views.
Figure 2B:
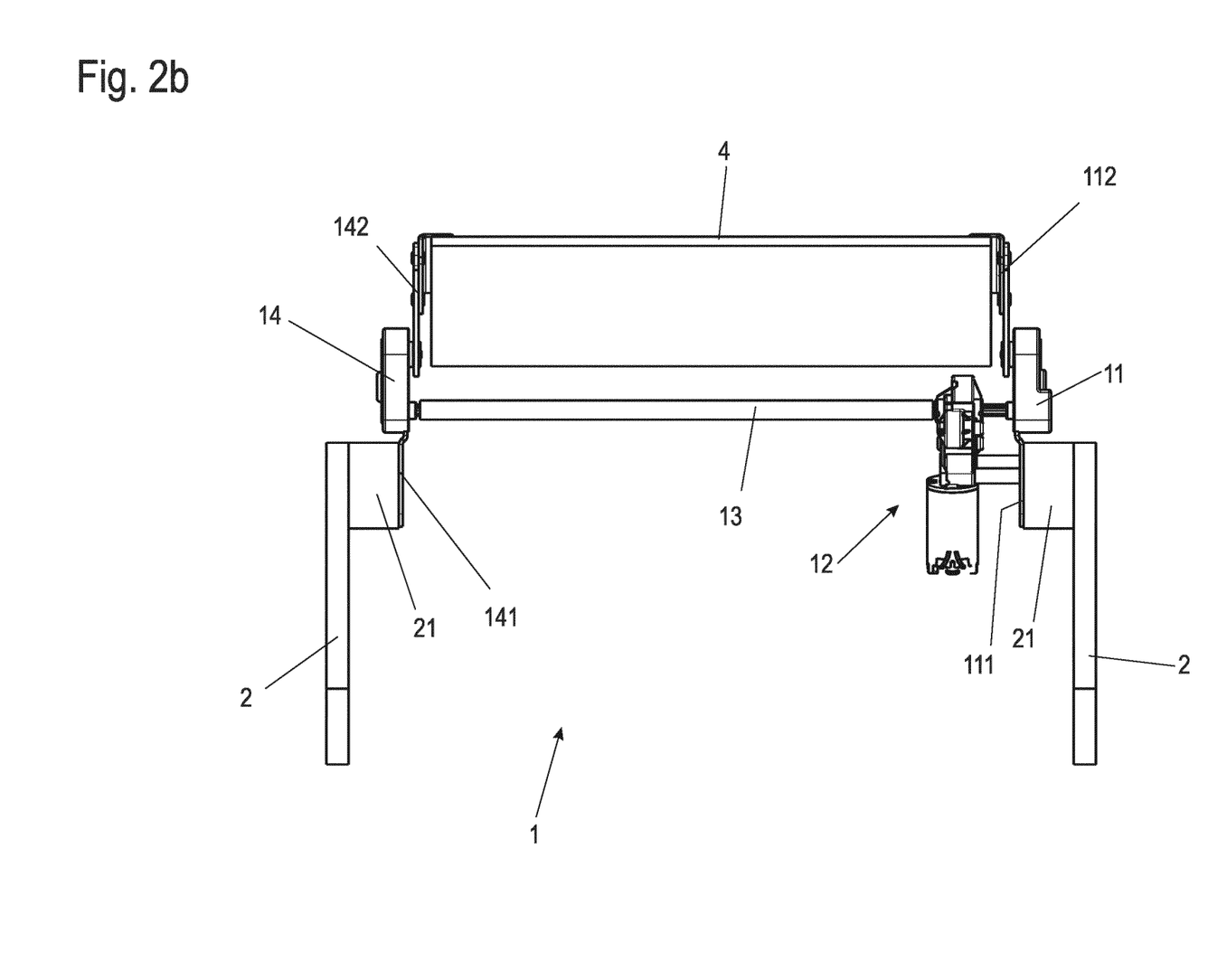
Figure 2C:
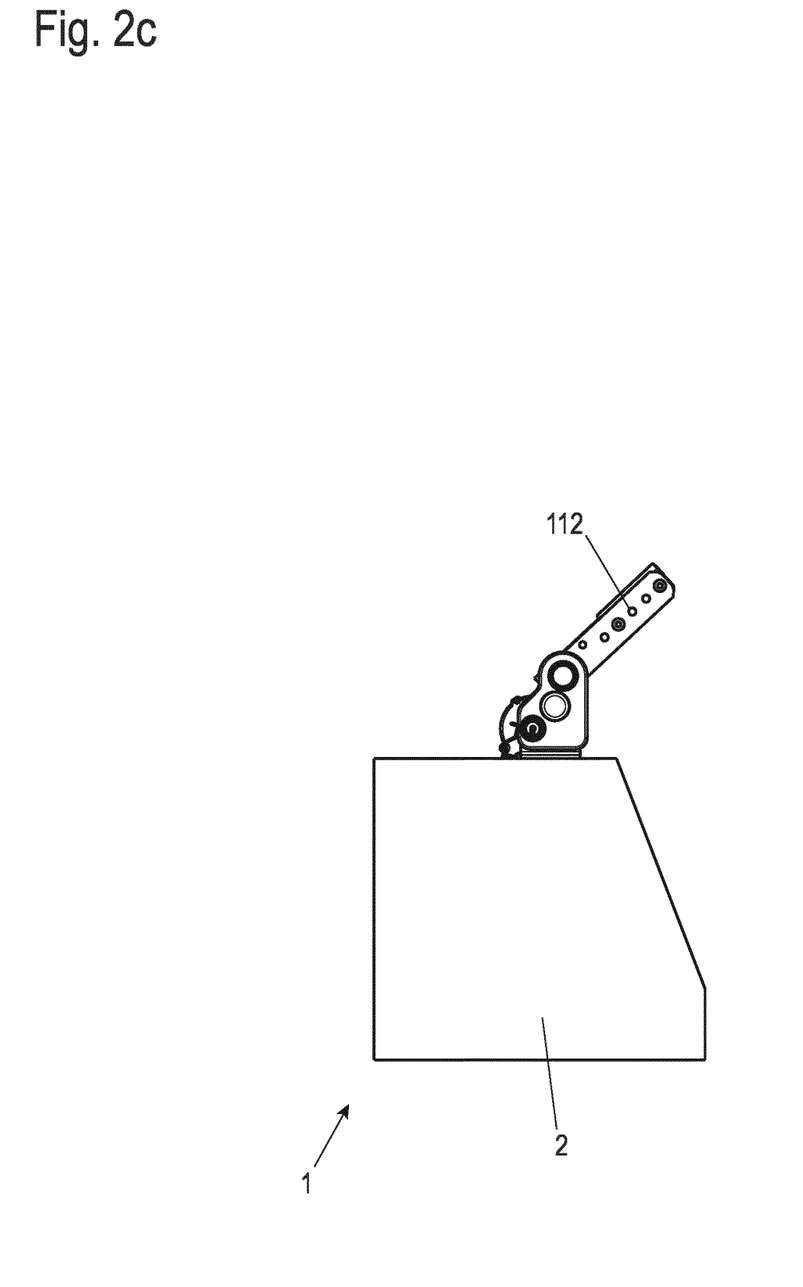

FIGS. 2a-c reproduce the section of the seating furniture 1 in the same way as FIGS. 1 a-c, but with the head part 3 being displaced at most towards the front, i.e., towards the user.

A pivoting of the head part 3 is produced electromotively via an adjusting unit 10. Of the head part 3, only a head plate 4 is shown by way of example. Also, the back part 2 is merely reproduced by interconnected plates forming a frame of the seating furniture 1. In the fully manufactured product, both the back part 2 and the head part 3 are provided with upholstery attached to the plates shown of the back part 2 and the head part plate 4, respectively.

The adjusting unit 10 has two pivot drives, a pivot drive 11 on one side of the back part 2 and a further pivot drive 14 on the other side of the back part 2. Both pivot drives 11, 14 serve to pivotably mount the head part 3 on the back part 2 and actively pivot the head part 3. For this purpose, they are coupled to a motor unit 12 which is attached to the pivot drive 11. The further pivot drive 14 is coupled to the motor unit 12 via a synchronous shaft 13, so that both pivot drives 11, 14 pivot synchronously during operation. For fastening, the pivot drives 11, 14 are mounted on suitable surfaces of the back part 2. In the exemplary embodiment shown, mounting blocks 21 are provided on the back part 2, which provide suitable surfaces for mounting the pivot drives 11, 14.

In an alternative design of the adjusting unit, it is also possible to drive only one side of the head part 3 on which the pivot drive 11 and the motor unit 12 are located. Instead of the further pivot drive 14, only a (passive) pivot fitting is then arranged on the other side of the head part 3. The synchronous shaft 13 is accordingly not required. This design is particularly suitable for narrow head parts 3, or generally for narrow support parts.

Figure 3A:
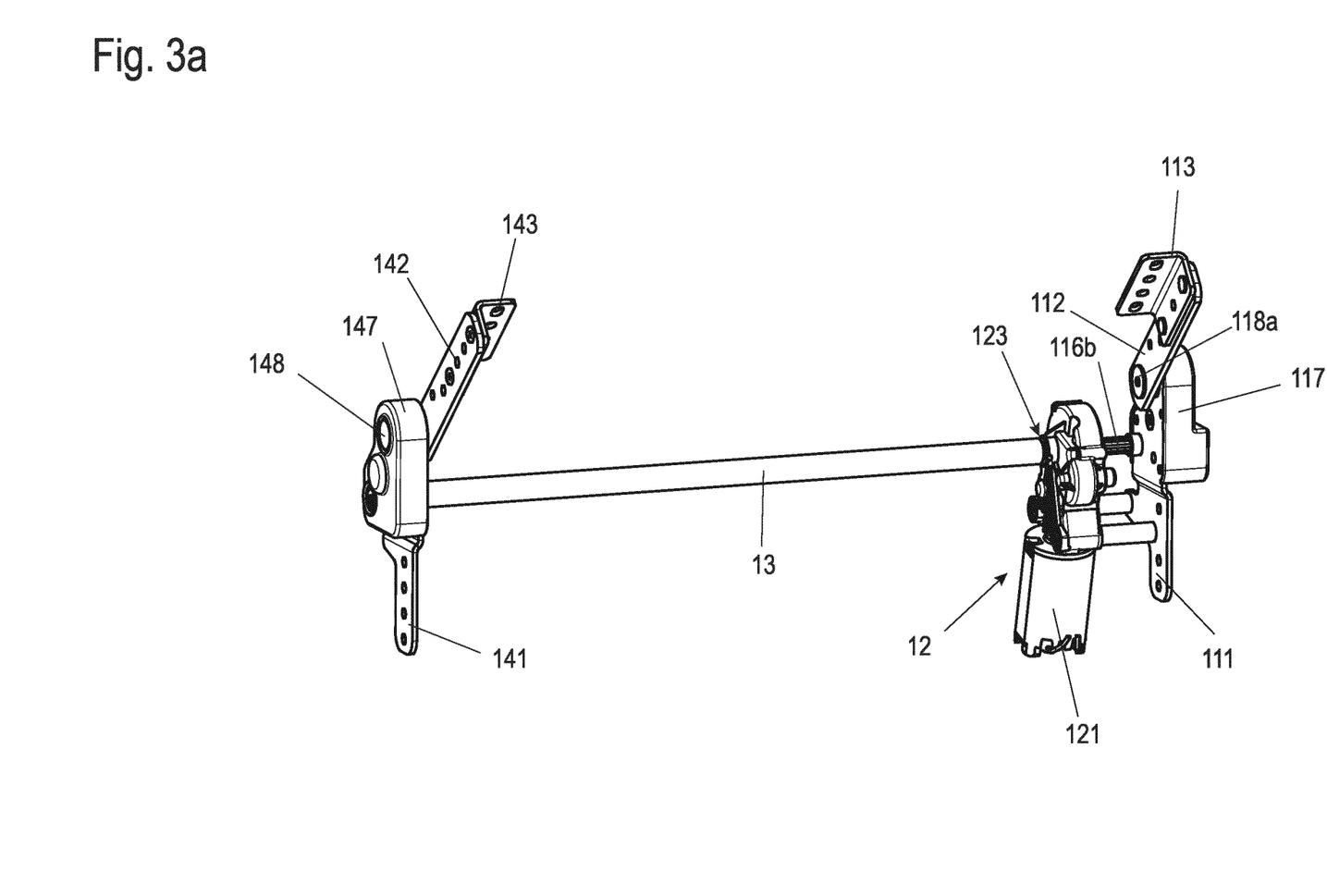
FIGS. 3a-c show various isometric views of the adjusting unit according to FIGS. 1a-2c in different views.
Figure 3B:
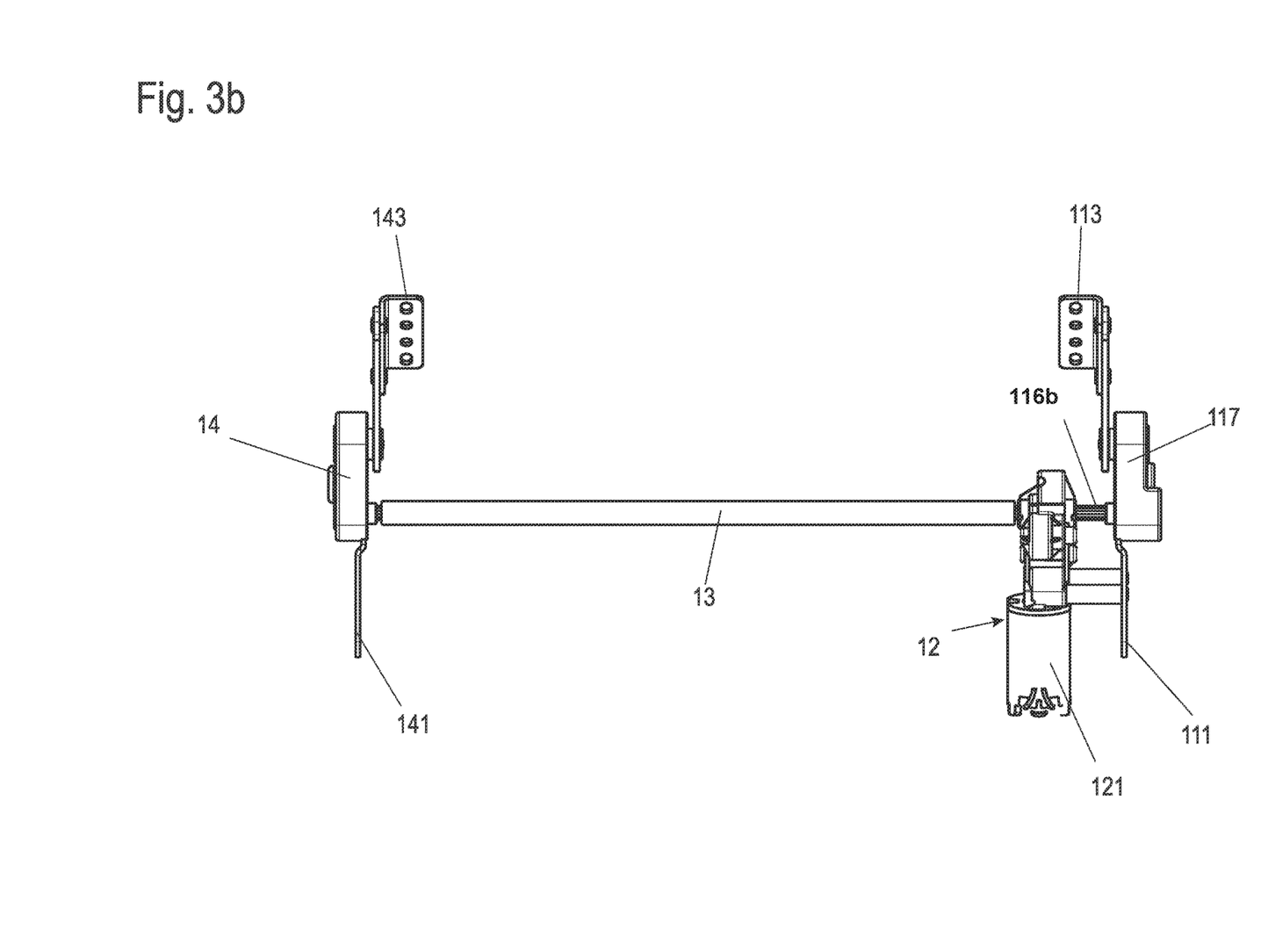
Figure 3C:
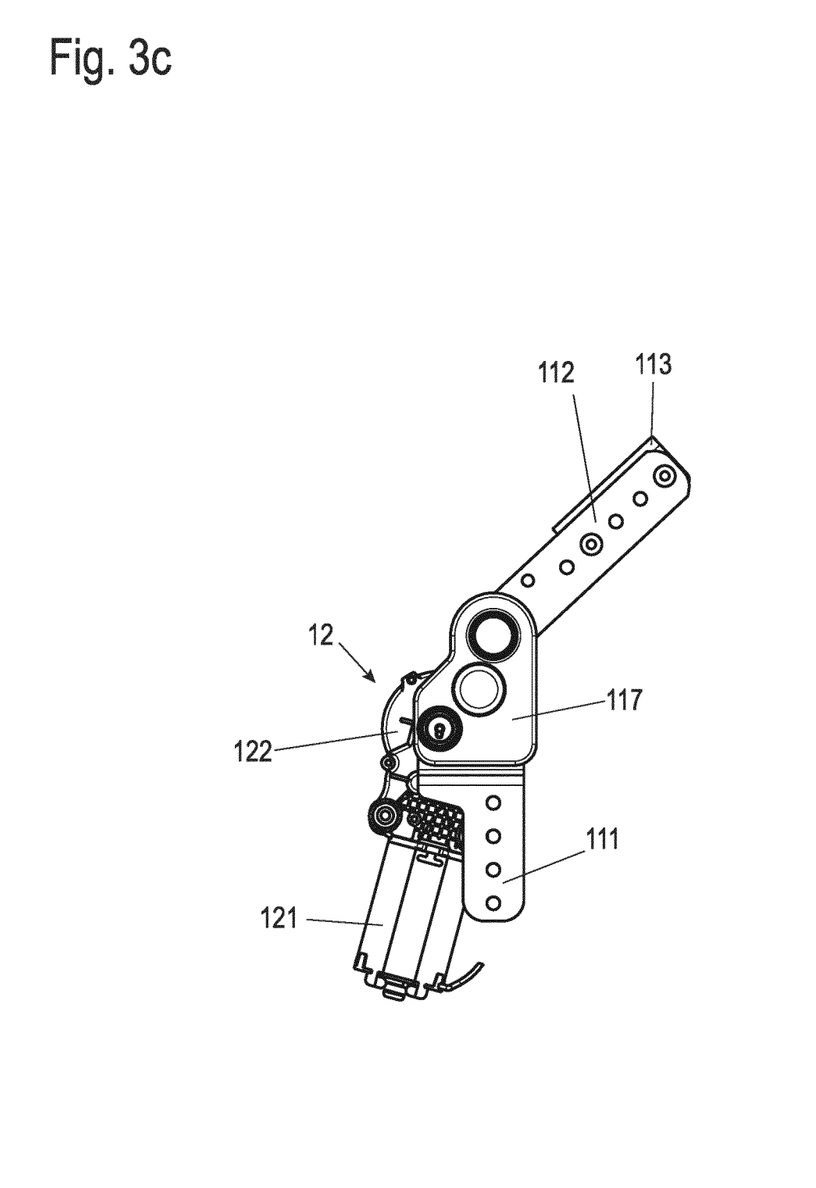
Figure 4:
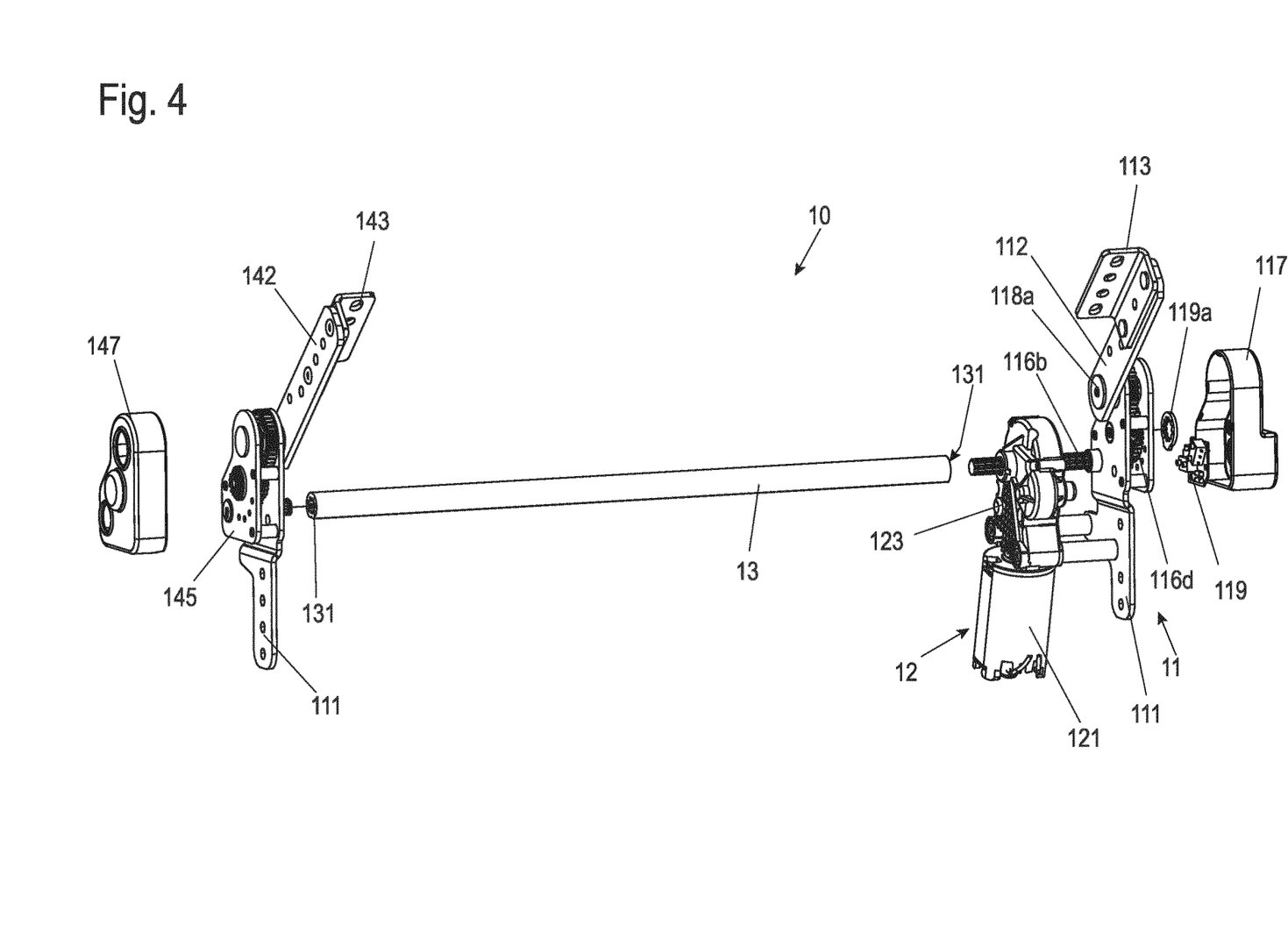
FIG. 4 shows an isometric partial exploded view of the adjusting unit according to FIGS. 3a-c.
Figure 5:
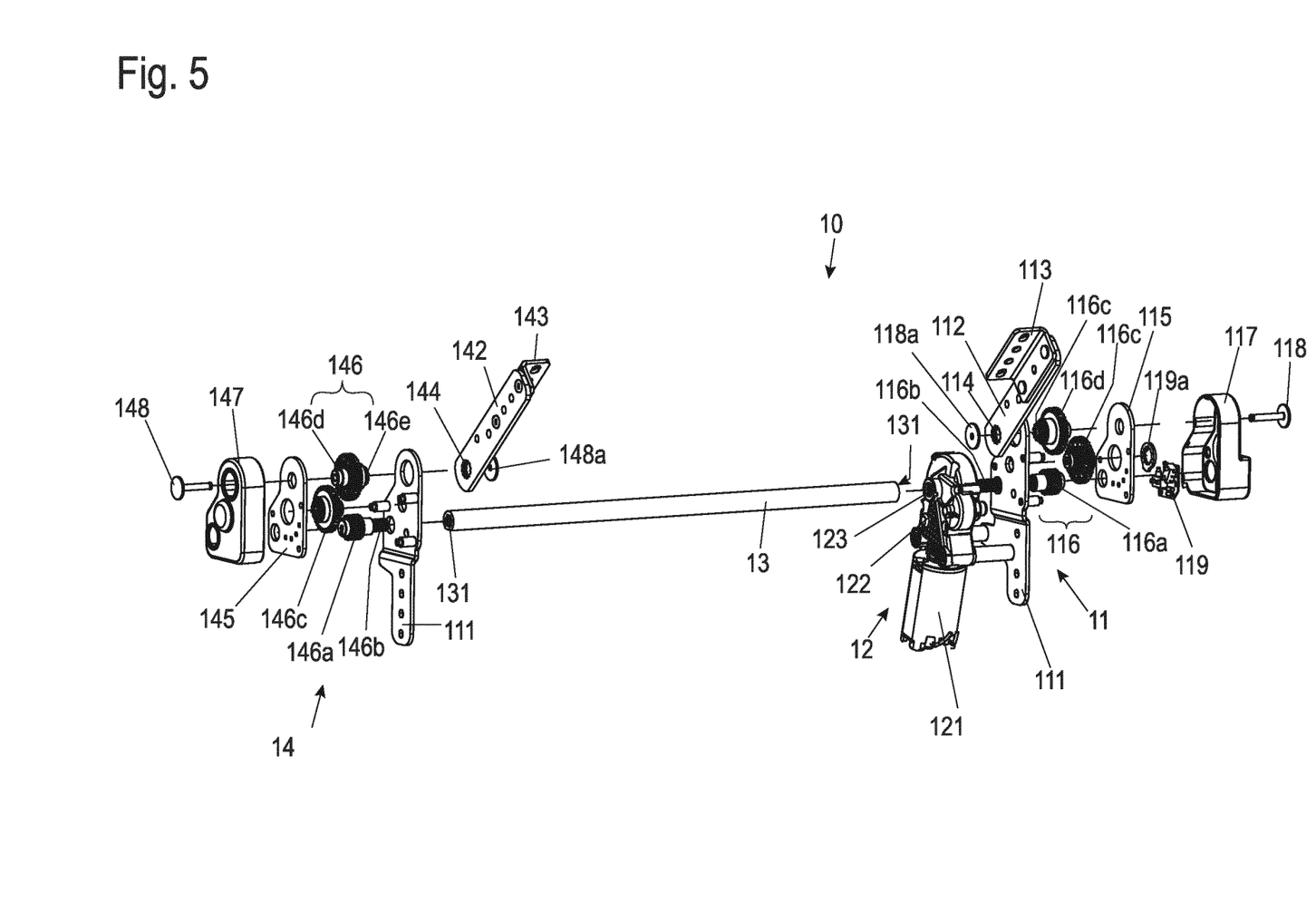
FIG. 5 shows an isometric overall exploded view of the adjusting unit according to FIGS. 3a-c.

In FIGS. 3a-c the adjusting unit is shown in the same view and at the same angle of rotation as in FIGS. 2a-c. FIGS. 3a-c thus show the adjusting unit 10 before it is connected to the head part plate 4 or the back section 2. FIG. 4 shows the adjusting unit 10 in an isometric partial exploded view, with the viewing angle and also the adjustment angle corresponding to those in FIG. 3a. FIG. 5 shows the adjusting unit 10 from the same viewing angle as FIG. 4 in a complete exploded view. The structure of the adjusting unit 10 is explained in more detail below with reference to FIGS. 3a-3c, 4 and 5.

The pivot drive 11 and/or the further pivot drive 14 of the adjusting unit 10 each comprise a carrier plate 111 and/or 141, which has preferably been created in a stamping process or a stamping and bending process.

In addition to bores that fasten the pivot drive 11 or the further pivot drive 14 to the back part 2, openings for receiving axle stubs of gearwheels 116 or 146 are formed on the carrier plates 111 or 141. The carrier plates 111, 141 thus also serve to support the gearwheels 116, 146. A bearing plate 115, 145 is provided on an opposite side of each of the gearwheels 116, 146 and has corresponding mirror-image bores for supporting the gearwheels 116, 146 on the side opposite the carrier plate 111, 141. In this respect, the bearing plates 115, 145 are arranged parallel to the carrier plates 111, 141 via spacer elements which are not further specified in the figures and are secured to the carrier plates 111, 141 via the spacer elements.

The gearwheels 116 and 146 shown each form a reduction gear to provide the high torques necessary to pivot the head part 3. A housing shell 117, 147 serves to cover each of the gears thus formed.

In the illustrated example, the gears are of three-stage construction and specifically each comprise a drive gearwheel 116a or 146a, an intermediate gearwheel 116c or 146c and an output gearwheel 116d or 146d. The drive gearwheel 116a or 146a is coupled to a drive shaft 116b, 146b and the output gearwheel 116d or 146d is coupled to or integrally made with an output element 116e, 146e.

The drive gearwheels 116a, 146a are driven by the motor unit 12, which in the present example is in turn designed as a geared motor and comprises an electric motor 121 and a downstream gear 122. The gear 122 may, for example, be a worm gear, wherein a worm is arranged on the electric motor 121 and acts on a worm wheel mounted on a hollow output shaft 123. The hollow output shaft 123 is engaged by the drive shaft 116*b* of the pivot drive 11.

The (worm) gear 122 may be designed to be self-locking, so that the head part 3 does not pivot when the gear motor 137 is not energized, even when external forces are applied. A configuration may also be chosen that is self-locking when moderate force is applied during proper use, but which causes the head part 3 to pivot when excessive external forces are applied. This counteracts damage to the adjusting unit 10 or its attachment to the back part 2 or the head part 3.

The output element 116*e*, 146*e* protrudes outwardly through the carrier plates 111, 141 and provides a mounting point to which an output plate 112, 142 is attached, each of which is mounted to the head part plate 4. For this purpose, the output plate 112, 142 is provided with a mounting bracket 113, 143 in the example shown. Instead of individual output plates 112, 142, a U-shaped round bracket can also be provided, which is attached to the output elements 116*e* and 146*e* with both of its legs. Extendable output plate plates known per se may also be used.

For the rotationally fixed connection between the output elements 116*e*, 146*e* and the output plates 112, 142, an internal multi-tooth 114, 124 is formed in each of the output plates 112, 142, in which the respective output element 116*e*, 146*e* engages positively. The output element 116*e*, 146*e* is provided with suitable toothing. In each case, a combination of rivet 118, 148 and washer 118*a*, 148*a* is provided which connects the output element 116*e*, 146*e* or the associated output gearwheel 116*d*, 146*d* to the respective retaining bracket 11, 12 also in the axial direction. The output element 116*e*, 146*e* and the associated output gearwheel 116*d*, 146*d* are provided with a continuous axial bore for the purpose. Instead of the combination of rivet 118, 148 and washer 118*a*, 148*a*, a combination of bolt and (secured or self-locking) nut may also be used.

Rotation of the output element 116*e*, 146*e* relative to the carrier plates 111, 141 correspondingly results in pivoting of the output plates 112, 142 and thus the head part plate 4 or the head part 3.

While the drive shaft 116*b* of the pivot drive 11 engages directly with the hollow output shaft 123 of the motor unit 12, the drive shaft 146*b* is coupled to the drive shaft 116*b* passing through the hollow output shaft 123 via the synchronous shaft 13. The synchronous shaft 13 has corresponding shaft receptacles 131 for rotationally fixed coupling with the drive shafts 116*b* and 146*b*. In this way, it is ensured that both pivot drives 11, 14 move synchronously when the motor unit 12 is actuated. Advantageously, identical gearwheels 116 or 146 are used in pairs for this purpose in the case of the pivot drive 11 and the further pivot drive 14.

A limit switch plate 119 is also arranged in or on the gear of the pivot drive 11, which has limit switches that are actuated when the output plate 112 reaches one of the two end positions also shown in FIGS. 1*a*-*c* and 2*a*-*c*, respectively. Cams may be arranged on one of the gearwheels 116 at suitable positions to actuate the limit switches of the limit switch plate 119.

In the exemplary embodiments, the adjusting unit 10 is shown by way of example in connection with the head part 3, which is pivotable relative to the back part 2. The adjusting unit 10 can likewise be used for adjusting another support part of an item of seating furniture, for example an armrest. In that case, a side part of the seating furniture is the body element with respect to which the armrest is pivoted.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Seating furniture
2 Back part
21 Mounting block
3 Head part
4 Head part plate
10 Adjusting unit
11 Pivot drive
12 Motor unit
13 Synchronous shaft
131 Shaft receptacle
14 Further pivot drive
111, 141 Carrier plate
112, 142 Output plate
113, 143 Mounting bracket
114, 144 Internal multi-tooth
115, 145 Bearing plate
116, 146 Gearwheels
116*a*, 146*a* Drive gearwheel
116*b*, 146*b* Drive shaft
116*c*, 146*c* Intermediate gearwheel
116*d*, 146*d* Output gearwheel
116*e*, 146*e* Output element
117, 147 Housing shell
118, 148 Rivet
118*a*, 148*a* Washer
119 Limit switch plate
121 Electric motor
122 Gear
123 Hollow output shaft

The invention claimed is:

1. An electromotive adjusting unit configured to adjust an inclination of a support part of an item of seating furniture, the electromotive adjusting unit comprising:
 a pivot drive, of the electromotive adjusting unit, configured to be fastened to a body element of the item of seating furniture, wherein the pivot drive has a carrier plate configured to fasten the pivot drive to the body element and on which at least two intermeshing gearwheels are mounted, wherein the at least two intermeshing gearwheels form a reduction gear;
 a bearing plate arranged parallel to the carrier plate, wherein the at least two intermeshing gearwheels are mounted in the bearing plate;

a rotatable output element of the electromotive adjusting unit;

an output plate, of the electromotive adjusting unit, mounted in a rotationally fixed manner on the rotatable output element, wherein the output plate is configured to carry the support part; and a motor unit coupled to one of the two intermeshing gear wheels and mounted to the carrier plate.

2. The electromotive adjusting unit of claim 1, wherein the rotatable output element positively engages in a corresponding receptacle of the output plate.

3. The electromotive adjusting unit of claim 1, wherein the rotatable output element is arranged or formed on one of the at least two intermeshing gearwheels gearwheels of the pivot drive.

4. The electromotive adjusting unit of claim 1, further comprising:

a further pivot drive coupled to the pivot drive via a synchronous shaft;

a rotatable output element; and a further output plate mounted in a rotationally fixed manner on the further rotatable output element, wherein the further output plate is configured to carry the support part.

5. The electromotive adjusting unit of claim 4, wherein the further pivot drive has a further carrier plate on which at least two further intermeshing gearwheels are mounted, which form a further reduction gear, wherein the further rotatable output element is arranged or formed on one of the at least two further intermeshing gearwheels of the further pivot drive.

6. The electromotive adjusting unit of claim 4, wherein the reduction gear of the pivot drive and the further reduction gear of the further pivot drive have a same reduction ratio, and wherein drive shafts of the reduction gear and the further reduction gear are coupled to a common motor unit.

7. The electromotive adjusting unit of claim 6, wherein the common motor unit comprises an electric motor and a downstream gear.

8. The electromotive adjusting unit of claim 7, wherein a transmission of the motor unit is a worm gear.

9. The electromotive adjusting unit of claim 1, wherein the output plate includes an internal multi-tooth into which the rotatable output element engages so that the output plate is mounted in the rotationally fixed manner on the rotatable output element.

10. An item of seating furniture, comprising:

a body element; and a support part pivotably mounted on the body element; and an electromotive adjusting unit, which comprises a pivot drive configured to be fastened to a body element of the item of seating furniture, wherein the pivot drive has a carrier plate configured to fasten the pivot drive to the body element and on which at least two intermeshing gearwheels are mounted, wherein the at least two intermeshing gearwheels form a reduction gear;

a bearing plate arranged parallel to the carrier plate, wherein the at least two intermeshing gearwheels are mounted in the bearing plate;

a rotatable output element;

an output plate mounted in a rotationally fixed manner on the rotatable output element, wherein the output plate is configured to carry the support part; and a motor unit coupled to one of the two intermeshing gear wheels and mounted to the carrier plate.

11. The item of seating furniture of claim 10, wherein the pivotally mounted support part is a head part of the item of furniture and is pivotable relative to a back part.

12. The item of seating furniture of claim 10, wherein the output plate includes an internal multi-tooth into which the rotatable output element engages so that the output plate is mounted in the rotationally fixed manner on the rotatable output element.

* * * * *